April 26, 1932.　　　　A. E. DOMAN　　　　1,856,050
APPARATUS FOR CONTROLLING THE BATTERY CHARGING CIRCUIT
OF VARIABLE SPEED DYNAMO ELECTRIC MACHINES
Filed Feb. 20, 1929　　　2 Sheets-Sheet 2
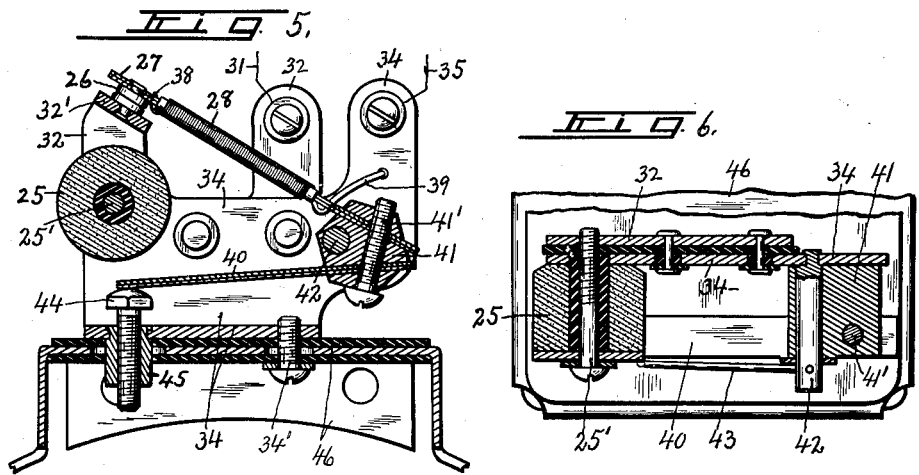
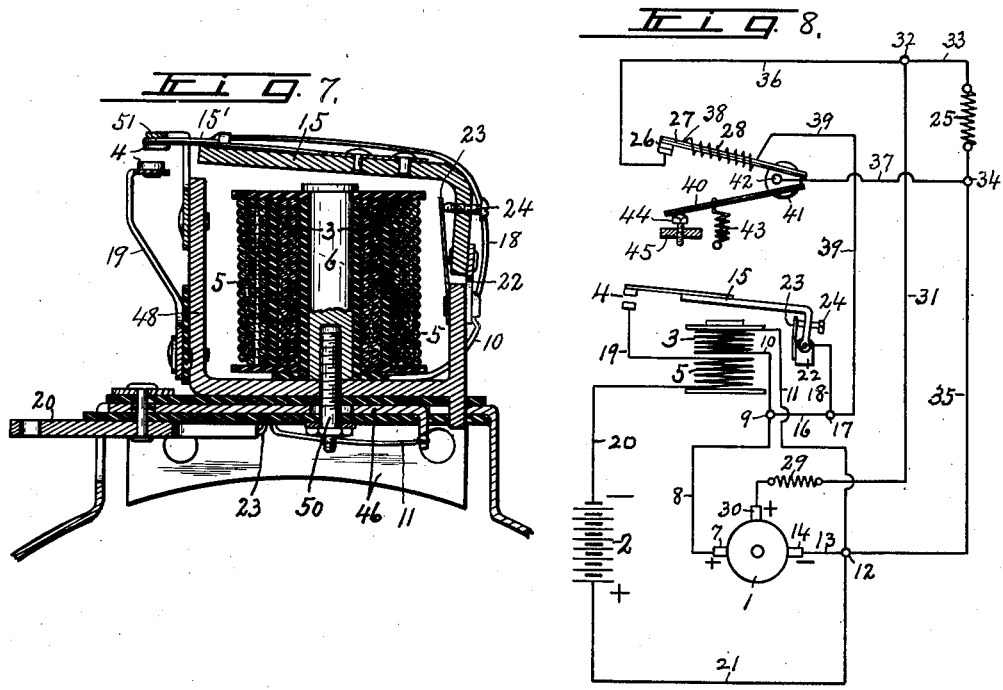
INVENTOR.
A. E. Doman
BY
Denison + Thompson
ATTORNEYS
WITNESS
J. J. Mains Patented Apr. 26, 1932

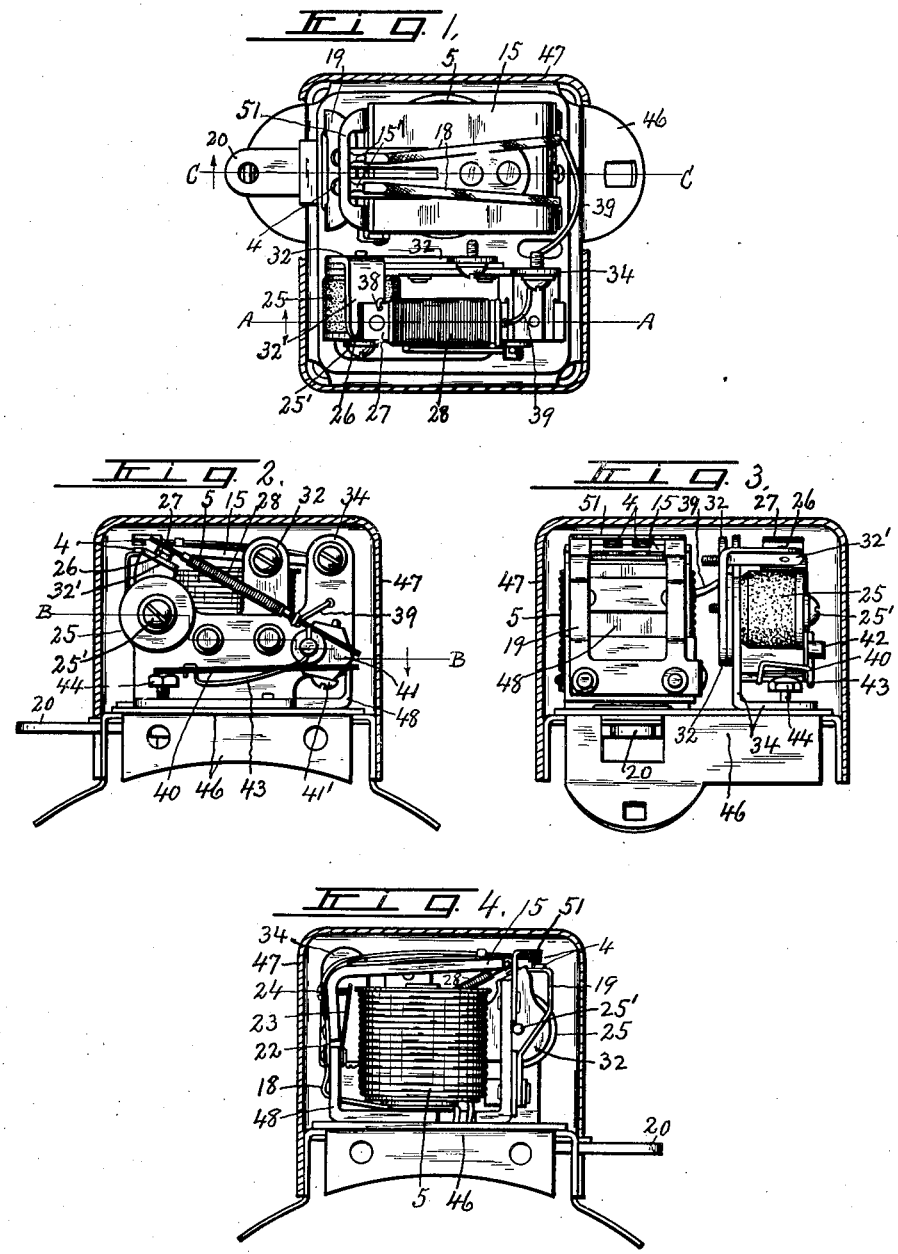

1,856,050

UNITED STATES PATENT OFFICE

ALBERT E. DOMAN, OF SYRACUSE, NEW YORK, ASSIGNOR TO OWEN-DYNETO CORPORATION, OF SYRACUSE, NEW YORK, A CORPORATION OF NEW YORK

APPARATUS FOR CONTROLLING THE BATTERY CHARGING CIRCUIT OF VARIABLE SPEED DYNAMO ELECTRIC MACHINES

Application filed February 20, 1929. Serial No. 341,424.

This invention relates to a combined voltage regulator and circuit controller for dynamo electric machines or generator adapted to be driven by a variable speed motor such, for example, as an internal combustion engine commonly used as motive power for automobiles and other motor vehicles.

In this class of vehicles it is customary to employ a storage battery as an initial source of electric energy for the starting motor, fuel ignition, electric lamps and other translating devices and to utilize current from the dynamo for charging the battery and also for supplying current to the various translating devices when the engine is running under its own power above predetermined speed.

Under these conditions it is evident that the output of the generator will vary materially with the widely varying speeds of the engine resulting in a correspondingly wide variation in the output which if not properly regulated frequently results in serious impairment or destruction of the battery by overheating or overcharging when the charging circuit is closed.

In order to reduce this liability I have used a dynamo electric machine of the third brush type as being most satisfactory and efficient for this particular work in that it automatically regulates to a certain extent the current voltage under widely varying speeds but when charging the battery as the latter becomes more fully charged instead of gradually reducing the charge as desired as the charging progresses and the battery voltage increases it actually increases the charging rate which if continued under certain conditions will eventually ruin the battery by overheating as a result of overcharging.

The present invention, therefore, contemplates not only the use of an automatic voltage regulating device, but also a circuit closer adapted to be operated by current from the dynamo for automatically closing the charging circuit when the speed of the engine and dynamo exceeds a predetermined rate, and the main object of this invention is to combine this automatic voltage regulator and automatic circuit controller in a single compact unit capable of being installed in relatively small space upon the generator or other part of the vehicle without in any way interfering with the other electrical equipment.

In the use of a generator of the character described an electric resistance and a thermostatic switch are connected in parallel in the third brush circuit in such manner that when the switch is closed it will short circuit or cut out the resistance while, on the other hand, if the switch is opened the resistance will be cut into the third brush circuit for the purpose of reducing the current voltage in case it should become dangerously excessive as a result of the increased rate of speed of the generator, and one of the specific objects of the present invention is to automatically cut this resistance into and out of the third brush circuit through the medium of an electric heater and a self-closing thermostatic switch in heat transfer relation thereto whereby the heat developed in said heater by excess voltage generated by the dynamo will automatically open the switch to cut in said resistance.

Another specific object is to control the opening of the thermostatic switch under widely varying atmospheric temperatures by means of an additional thermostatic bar operatively connected thereto in such manner that any tendency of the thermostatic switch to open under relatively high atmospheric temperatures will be counteracted by the action of the compensating thermostatic bar.

Other objects and uses relating to specific parts of the apparatus will be brought out in the following description.

In the drawings:

Figure 1 is a top plan of a combination voltage regulator and charging circuit controller mounted in compact relation upon a suitable supporting base and protected by a suitable cover shown in section.

Figures 2, 3, and 4 are separate elevations of different sides of the same device showing the cover in section.

Figure 5 is an enlarged sectional view taken in the plane of line A—A, Figure 1.

Figure 6 is an enlarged detail sectional view taken in the plane of line B—B, Figure 2.

Figure 7 is an enlarged sectional view taken in the plane of line C—C, Figure 1.

Figure 8 is a diagrammatic view of the voltage regulator and circuit controller showing also an electric generator of the third brush type with the electrical resistance in the third brush circuit, and a storage battery actively connected to the generator circuit to be charged thereby.

As shown in Figure 8 the voltage to be regulated and circuit to be controlled derive current from a dynamo electric machine —1— commonly used in motor vehicles and not necessary to herein further illustrate or describe.

The current from the generator —1— may also be used in the operation of the translating devices previously mentioned and for charging the battery —2— in addition to effecting the operation of the voltage regulator and circuit controller when the engine is being operated under its own power.

Battery charging circuit

The battery charging circuit includes therein an electromagnet winding 3, a self-opening electric switch —4— and a separate electromagnet winding —5— both of said windings being mounted upon one and the same core —6—, for compactness and increased efficiency as will be hereinafter more fully explained.

Current is supplied to the winding 3 from one brush 7 of the generator —1— through wire —8—, terminal —9— and thence by wire 10 through the winding —3— and return through wire 11 to a terminal 12 and thence through wire 13 to the opposite brush 14 of the main generator switch.

The electromagnet of which the windings 3 and 5 form a part is provided with an armature 15 of electric conducting material carrying one of the contacts of the switch —4—, said armature being electrically connected by a wire 18 to a terminal 17 in the battery charging circuit.

This armature 15 is connected to the same side of the main generator circuit as the winding 3 by means of terminal 9, wire 16, terminal 17 and wire 18.

The other contact of the switch 4 is connected by wire 19 to one end of the winding 5 having its other end connected by wire 20 to the negative side of the battery 2, the opposite pole of the battery being electrically connected by a wire 21 to the terminal 12 and return through the wire 13 and brush 14 to the generator.

It is now apparent that the switch 4 and winding 5 are electrically connected in series in the battery charging circuit deriving current from the generator —1—.

The switch member 15 is pivotally mounted upon a suitable support 22 and is normally held in its open position by a spring 23, the tension of which may be adjusted by a screw 24 to hold the armature 15 in more or less close proximity to the core 6 of the electromagnet and to resist magnetic attraction under relatively low voltage due to low speeds of the generator but capable of operation to close the switch when the speed of the generator exceeds a predetermined rate.

When the generator —1— is driven at a predetermined rate of speed the energization of the electromagnet through the coil or winding 3 will effect the operation of the armature 15 to close the switch 4 and thereby to close the main generator circuit through the battery 2 for charging purposes at which time the winding 5 of the electromagnet will be energized to increase the magnetic pull upon the armature 15 and thereby to hold the switch closed during the battery charging operation or until the battery is fully charged within a safe limit.

Voltage regulator

An electrical resistance 25 and a thermostatic switch 26 are connected in parallel in the third brush circuit of the generator 1, the switch 26 being of the self-closing type and including a thermostatic bar 27 in heat receiving relation to an electric heater 28 which is electrically connected in the main circuit of the generator 1 so that an excessive degree of heat developed in the heater by the gradually increasing voltage of the generator —1— will tend to deflect the switch member 27 away from its cooperative contact of the switch 26 for opening the switch and thereby cutting in the resistance 25 for limiting the output of the generator to a safe degree for battery charging and other purposes.

As illustrated, in Figure 8, the third brush circuit of the generator —1— includes therein a series winding 29 in series with the resistance 25 and switch 26 so that current may pass from the third brush 30 of the generator through the series winding and thence through a conductor 31 to a terminal 32 from which the current may pass through a conductor 33 to the resistance 25 to a terminal 34 and thence through a return conductor 35 to the brush 14 of the generator.

Or, the current from the third brush of the generator may pass from the terminal 32 through a conductor 36 to the switch 26 and thence through the thermostatic bar 27 and a conductor 37 to the terminal 34 to return through the conductor 35 to the brush 14 of the generator.

The electric heater 28 is preferably made in the form of a coil wound around the thermostatic bar 27 but insulated therefrom except that one end is electrically connected thereto at 38, the other end being connected by conductor 39 to the terminal 17 of the main generator circuit so that current may pass from the brush 7 of the generator 1 through the conductor 8, terminal 9, conductor 16, terminal 17, and conductor 39 through the heater coil 28 and return through the thermostatic bar 27 and conductors 37 and 35 to the other brush 14 of the generator.

It will now be understood that the thermostatic switch 26 is normally closed to short circuit or cut out the resistance 25 from the third brush circuit of the generator and that if the speed and voltage of the generator increases beyond a certain safe degree by the increased speed of the engine it will result in heating the coil 28 and thereby cause a deflection of the thermostatic bar 27 away from its companion contact member of the switch to open said switch and thereby cut in the resistance 25, the effect of which is to limit the current voltage output of the generator within safe battery charging limits, it being further understood that during this increased speed of the generator the circuit closing switch —4— for the battery charging circuit will be automatically closed.

It is obvious that the thermostatic switch bar 27 will be subject to widely varying atmospheric temperatures which in some instances will be sufficiently high to cause the premature opening of the switch 26 and in order to avoid this condition the regulator is provided with what may be termed a compensating thermostatic bar 40 which, together with the thermostatic bar 27, are secured at one end to a supporting member 41, the latter being pivoted at 42 to a suitable support to permit it, together with the bars 27 and 40 to rock laterally in the direction of deflection of said bars when subjected to predetermined temperatures.

The thermostatic bars 27 and 40 project in the same general direction from their support 41 but preferably at a divergent angle to enable the regulator to be assembled in compact space, both bars and the support 41 being spring-pressed in the switch-closing direction by a spring 43.

The movement of the bars 27 and 40 and their support 41 is limited by an adjustable stop screw 44 mounted upon a supporting member 45 which forms a part of the supporting frame for the voltage regulating and circuit closing unit.

The compensating bars 27 and 40 are arranged to deflect in the same direction under relatively high atmospheric temperatures against the action of the spring 43 and in the absence of such spring or equivalent retracting means the switch 26 would tend to open prematurely, but it is evident that any tendency of the thermostatic bar 40 to deflect away from its stop screw 44 would be offset by the action of the spring 43 in holding said bar against the stop screw and thereby holding the thermostatic switch 26 in its closed position under widely varying atmospheric temperatures.

It will be observed, however, that in case of excessive voltage of the generator the resultant heating of the coil 28 would cause an independent deflection of the thermostatic bar 27 to open the switch 26 and thereby cut in the resistance 25 for limiting the output of the generator to within safe limits for charging and other purposes and incidentally preventing overcharging of the battery 2.

*Regulator unit*

The automatic circuit closer for the battery charging circuit and the voltage regulator are closely correlated in that both are used in the automatic control of the charging circuit and are preferably assembled in compact relation upon and within a suitable supporting frame comprising a base section 46 and a removable cap section 47, both of which may be made of metal or any other suitable material.

The base 46 is adapted to be mounted upon the frame of the electric generator —1—, but obviously may be placed in any other convenient position to permit the removal of the cap 47 when desired for inspection or repairs of the enclosed parts.

As illustrated more clearly in Figures 4 and 7, the automatic circuit closer is mounted within and upon a substantially U-shaped metal frame 48 which, in turn, is secured to the base 46 in insulated relation thereto with its opposite arms extending outwardly unequal distances therefrom for receiving and supporting the switch members of the circuit closer.

The movable switch member 15 is L-shaped and yieldingly connected to the shorter arm of the frame 48 by means of a spring connection 22 which constitutes the direct support for the movable switch member.

This switch member 15 extends laterally across the outer end of the electromagnet core —6— and carries one of the contacts of the switch —4—, the other contact being mounted upon a supporting member —19— which, in turn, is secured to but insulated from the longer arm of the frame 48 as shown more clearly in Figure 7.

As previously stated, the electro-magnet is provided with separate windings 3 and 5 encircling the core 6, said magnet being mounted within the frame 48 and is secured by a bolt 50 to the base 46 in insulated relation thereto.

The spring 23 for opening the switch member 15 is secured to the shorter arm of the frame 48 and normally engages the inner end of an adjusting screw 24 on the switch member 15, Figure 7, said spring serving to yieldingly hold the switch member 15 in its open position.

The opening movement of the switch member 15 is limited by a suitable stop 51 which is secured to the longer arm of the frame 48 to overhang the outer ends of the contact supporting extensions 15' of the switch member 15, said stop 51 being provided with an opening for receiving the extensions 15' as shown more clearly in Figures 1 and 7.

The current voltage regulator is mounted upon an angle plate 34 of electric conducting material which is secured to the supporting base 46 in insulated relation thereto in close proximity to the circuit closer previously described and forms the conductor 34 in the resistance side of the third brush circuit for receiving and supporting the resistance 25 and the thermostatic bar support 41.

An additional plate 32 of electric conducting material is mounted upon the inner face of the plate 34 in parallel insulated relation thereto and is provided with a lateral offset 32' overhanging the resistance 25 and base of the conducting plate 34 for receiving and supporting the stationary contact of the thermostatic switch 26.

The electric resistance 25 is electrically interposed between the conducting plates 32 and 34 in electrical connection therewith in that one end thereof is in direct electrical contact with the outer face of the plate 34 while the opposite end is in direct electrical contact with the head of a clamping screw 25' which is passed through an insulating bushing within the resistance 25 and is screwed into a threaded aperture in the plate 32 thereby establishing an electrical connection between the outer end of the resistance 25 and the plate 32.

This electrical resistance is, therefore, placed in electrical connection with both plates 32 and 34 as shown more clearly in Figure 6 in which it will be observed that the insulation between the plates 32 and 34 is continued through the electrical resistance 25.

The electrical resistance 25 preferably consists of a disk of carbon or equivalent material thereby avoiding the use of wires for that purpose and at the same time permitting the resistance to be readily clamped in operative position or removed by simply tightening or loosening the clamping screw 25'.

The supporting post 41 for the thermostatic bars 27 and 40 is journaled upon the pivotal stud 42 which, in turn, is secured to the plate 34 in electrical connection therewith, the post 41 being made of electric conducting material and is also held in electrical contact with the stud 42 and with the plate 34, as shown more clearly in Figure 6.

The thermostatic bars 27 and 40 are secured by a clamping bolt 41' in diverging slots in the post 41 at opposite sides of the pivotal stud 42 so that their opposite ends extend approximately tangential to opposite sides of the periphery of the electrical resistance 25 as shown more clearly in Figure 5 thus utilizing the space between the forwardly diverging ends of the bars for the reception of said resistance without in any way interfering with the free operation of said bars.

The base of the plate 34 of the voltage regulator is secured to the base 46 by means of a clamping screw 34' in insulated relation to the metallic part of said base as shown in Figure 5.

The advantage in mounting the circuit closer for the battery charging circuit together with the voltage regulator both upon one and the same base is that all the parts may be brought into relatively small compact relation and the metallic portion of the base which is secured to the frame of the generator may be used as a ground for various electrical parts of the regulating unit as a unit and also permits certain conductors to be used in the operation of both elements.

Operation

When the dynamo electric machine —1— is driven in excess of a predetermined rate of speed the electromagnetic coil 3 will be energized to close the switch 4 thereby closing the circuit through the magnet coil 5 and battery 2 for charging said battery, the coils 3 and 5 serving to hold the switch 4 in its closed position as long as the speed of the generator is maintained above the predetermined rate as governed by the speed of the engine.

That is, the circuit closer is adjusted to close at a motor speed of approximately 15 miles an hour more or less and it, therefore, follows that the switch —4— will remain open under all speeds less than that predetermined and will remain closed under higher speeds of the motor.

The voltage regulator is adapted to prevent overcharging of the battery and for this purpose the generator is preferably of the third brush type with a resistance connected in one side of the third brush circuit and the thermostatic switch 26 connected in the same circuit in parallel with the resistance, the electric heater 28 being connected in the main dynamo circuit.

It, therefore, follows that as long as the output of the generator remains below a safe charging degree the switch 26 will remain closed thereby short circuiting or cutting out the resistance 25.

On the other hand, should the voltage output of the generator exceed a safe charging limit the temperature of the heater 28 would be raised to a sufficient extent to cause the deflection of the thermostatic bar 27 away from its cooperative contact of the switch 26 thereby opening the switch and cutting in the resistance 25 in the third brush circuit, the effect of which is to limit the further increase in the voltage output of the generator in a manner well-known to those skilled in this art.

It is, of course, evident from the foregoing description that as the voltage of the generator is reduced below a safe charging limit the heater 28 will be more or less deenergized to allow the thermostatic switch 26 to close and thereby to short circuit the resistance, these operations being repeated as the output of the generator varies with the varying speed of the motor.

Another important feature of the thermostatic regulator is the use of the compensating bar 40 in connection with the thermostatic switch 26 to prevent the premature opening of the switch in case of relatively high atmospheric temperatures.

For example, if the atmospheric temperature is sufficient to deflect the thermostatic bar 27 it would also produce a corresponding deflection of the compensating bar 40 in the same direction under which conditions the spring 43 would hold the bar 40 in contact with its stop 44 and thru the medium of the connection of both bars with the same post 41 would keep the switch 26 in its closed position since both bars are movable in unison about the axis of movement of the post 41.

I claim:

1. The combination with a battery charging circuit of a variable speed dynamo electric machine of the third brush type having an electrical resistance in the third-brush field circuit, a thermostatic switch in said circuit normally short-circuiting said resistance, an electric heater responsive to the dynamo voltage and in heat transfer relation to said switch for opening the same and thereby cutting in the resistance, and means including a thermostatic member normally and yieldingly holding the switch in its closed position, said switch and its thermostatic member being susceptible to movement in the direction of opening of the switch by the temperature of the surrounding atmosphere above a predetermined degree.

2. The combination with a battery charging circuit of a dynamo electric machine of the three brush type having an electrical resistance in the third brush field circuit, of a thermostatic switch and a supplemental thermostatic member operatively connected to the movable switch member to move therewith, said members being susceptible to deflection in the switch opening direction by temperature changes in the surrounding atmosphere, means for urging said members in the switch-closing direction, means for limiting the last-named movement, and an electric heater responsive to the dynamo voltage and in heat transfer relation to the thermostatic switch for opening the switch independently of the other thermostatic member.

3. The combination with a battery charging circuit of a dynamo electric machine of the three brush type having an electrical resistance in the third brush field circuit, of an electro-thermostatic switch comprising two thermostatic members mounted on a movable support for thermal deflection in the direction of opening movement of the switch and spring-pressed in the opposite direction to close the switch, means for limiting the movement of said members in the last-named direction, and electrical means responsive to the dynamo voltage for automatically opening the switch when the voltage in the dynamo circuit exceeds a certain limit.

In witness whereof I have hereunto set my hand this 18th day of February, 1929.

ALBERT E. DOMAN.